United States Patent
Song et al.

(10) Patent No.: US 11,798,165 B2
(45) Date of Patent: Oct. 24, 2023

(54) TUMOR DETECTION AND SEGMENTATION FOR DPI AI PLATFORM ROUTES

(71) Applicant: Sony Group Corporation, Tokyo (JP)

(72) Inventors: Bi Song, San Jose, CA (US); Ko-Kai Albert Huang, San Jose, CA (US); Ming-Chang Liu, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 402 days.

(21) Appl. No.: 17/082,951

(22) Filed: Oct. 28, 2020

(65) Prior Publication Data

US 2022/0130049 A1 Apr. 28, 2022

(51) Int. Cl.
*G06T 7/11* (2017.01)
*G06T 7/136* (2017.01)
(Continued)

(52) U.S. Cl.
CPC ............ *G06T 7/11* (2017.01); *G06T 7/0012* (2013.01); *G06T 7/136* (2017.01); *G06T 7/162* (2017.01);
(Continued)

(58) Field of Classification Search
CPC ......... G06T 7/11; G06T 7/0012; G06T 7/136; G06T 7/162; G06T 2207/20004; G06T 2207/20072; G06T 2207/20081; G06T 2207/30024; G06T 2207/30096; G06T 2207/10024; G06T 7/194; G06T 2207/10056; G06T 2207/20008;
(Continued)

(56) References Cited

U.S. PATENT DOCUMENTS

| 10,176,579 B2 | 1/2019 | Chukka et al. |
| 2017/0270346 A1* | 9/2017 | Ascierto ............... G06V 20/69 |

(Continued)

FOREIGN PATENT DOCUMENTS

| CN | 110472676 | 11/2019 |
| WO | WO2019077108 | 4/2019 |

OTHER PUBLICATIONS

Muñoz-Aguirre et al. "PyHIST: a Histological Image Segmentation Tool." PLOS Computational Biology, https://doi.org/10.1371/journal.pcbi.1008349, Oct. 19, 2020, pp. 1-9 (Year: 2020).*

*Primary Examiner* — Jon Chang
(74) *Attorney, Agent, or Firm* — Trellis IP Law Group, PC

(57) ABSTRACT

A method of tumor detection and segmentation accepts a first Whole Slide Image (WSI) having a first resolution; creates a corresponding second WSI having a second resolution lower than the first resolution; applies an adaptive thresholding technique to the second WSI to create a background removal mask background; applies the mask to the first WSI to provide a third WSI with extracted patches, characterized by a third resolution, greater than the second resolution and lower than the first resolution; uses a first machine learning system on the third WSI to create a heat map at the third resolution, indicating a subset of the patches likely to include one or more clusters of tumor cells; and uses a second machine learning system on the first WSI and the heat map to segment each patch in a corresponding output image at the first resolution, outlining one or more corresponding clusters.

20 Claims, 6 Drawing Sheets

(51) Int. Cl.
  *G06T 7/00* (2017.01)
  *G06T 7/194* (2017.01)
  *G06T 7/162* (2017.01)

(52) U.S. Cl.
  CPC .... *G06T 7/194* (2017.01); *G06T 2207/20004* (2013.01); *G06T 2207/20072* (2013.01); *G06T 2207/20081* (2013.01); *G06T 2207/30024* (2013.01); *G06T 2207/30096* (2013.01)

(58) Field of Classification Search
  CPC .......... G06T 2207/20016; G06T 2207/20084; G06V 20/698
  See application file for complete search history.

(56) References Cited

U.S. PATENT DOCUMENTS

2019/0355113 A1   1/2019  Wirch et al.
2021/0018742 A1*  1/2021  Stumpe ................ G06V 20/698

* cited by examiner

TUMOR DETECTION AND SEGMENTATION FOR DPI AI PLATFORM ROUTES

BACKGROUND

Detecting and delineating clusters of cancerous cells in a digital pathology image (DPI) is obviously an important and valuable task, but one that can be extremely time consuming for the pathologist. Current approaches to address this issue apply artificial intelligence, which in effect means machine learning systems in this context, to the process, for example by creating and applying algorithms to detect and flag portions of the image as being of particular interest, without needing real time input from any expert. Even so, the sheer quantity of image information to be processed is daunting, involving data loads of the order of tens of Giga Bytes of raw date per whole slide image (WSI). FIG. 1 indicates one typical example of a WSI.

Consider the initial image processing step of background removal, carried out on such images of stained tissue slices. The goal of background removal is to remove parts of the image where no tissue is present, so that imaging processing power is not wasted in examining those regions. The stain or stains act as markers for cells, both cancerous and non-cancerous, in the tissue, showing their general layout and distribution over the sample. The slices are imaged using transmitted light, so pixels in regions where there is no tissue will show up as being very bright, with a narrow range of high intensity values, while pixels in regions with normal or cancerous cells have a much broader distribution of lower optical intensity. A typical approach to automatically distinguishing between the pixels with very high intensity counts, the background pixels, and pixels with a range of lower counts, corresponding to cells, is to simply define an intensity threshold in a histogram of the pixel data that is much lower than the peak intensity of the background pixels, but higher than the lower peak intensity of the "cell" pixels. FIG. 2, to be discussed in more detail below, illustrates such a histogram, with a correspondingly defined threshold. This approach has the drawback that a significant number of cells with meaningful information, in the right hand "tail" of the lower, left hand peak in the distribution, may be excluded along with the background pixels in the taller, right hand peak. The result is that some clusters of cells may not be included the next steps of image processing, and so clinically significant results may be missed.

Other challenges faced by attempts to automate tumor detection and segmentation using AI or machine learning include (1) the wide variety of biological structures and textures that may be encountered; (2) sometimes very subtle appearance differences between normal and cancerous cells; (3) great variations in the appearance of the same type of tissue according to how that tissue was acquired and processed to create the slide; and (4) the possible presence of both micro-metastases and macro-metastases in the same image. Using a single, high resolution level for multiple image processing tasks, as is currently done, may be quite wasteful in terms of the demand on processing resources.

There is, therefore, a need to develop methods and systems for tumor detection and segmentation that are more efficient in their use of computer resources and pathologist time than those currently available. Ideally these methods and systems would carry out background removal on information-rich WSIs with less risk of losing diagnostically relevant data, and would apply AI or machine learning to address subsequent stages of image processing at optimized levels of image resolution, according to the task at hand.

SUMMARY

Embodiments generally relate to methods and systems for tumor detection and segmentation for Digital Pathology. In one embodiment, a method comprises: accepting as an input a first Whole Slide Image (WSI) characterized by a first resolution; creating a second WSI by sampling the first WSI such that the second WSI is characterized by a second resolution lower than the first resolution; and applying an adaptive thresholding technique to the second WSI to create a mask distinguishing background from one or more patches, where the mask is characterized by the second resolution. The method further comprises applying the mask to the first WSI to extract the one or more patches, providing a third WSI with the extracted patches, characterized by a third resolution, greater than the second resolution and lower than the first resolution; using a first machine learning system to operate on the third WSI to create a heat map indicating a subset of the patches likely to include one or more clusters of tumor cells; and using a second machine learning system to operate on the first WSI in conjunction with the heat map such that each patch of the subset is segmented in a corresponding output image at the first resolution, outlining one or more corresponding clusters.

In another embodiment, an apparatus comprises one or more processors; and logic encoded in one or more non-transitory media for execution by the one or more processors, where the logic, when executed, is operable to: accept as an input a first Whole Slide Image (WSI) characterized by a first resolution; create a second WSI by sampling the first WSI such that the second WSI is characterized by a second resolution lower than the first resolution; apply an adaptive thresholding technique to the second WSI to create a mask distinguishing background from one or more patches, where the mask is characterized by the second resolution. The logic is further operable to: apply the mask to the first WSI to extract the one or more patches, providing a third WSI with the extracted patches, characterized by a third resolution, greater than the second resolution and lower than the first resolution; use a first machine learning system to operate on the third WSI to create a heat map at the third resolution, indicating a subset of the patches, each patch in the subset considered likely to include one or more clusters of tumor cells; and use a second machine learning system to operate on the first WSI in conjunction with the heat map such that each patch of the subset is segmented in a corresponding output image at the first resolution, outlining one or more corresponding clusters.

In yet another embodiment, an apparatus comprises one or more processors; and software encoded in one or more computer-readable media for execution by the one or more processors, where the software, when executed, is operable to: accept as an input a first Whole Slide Image (WSI) characterized by a first resolution; create a second WSI by sampling the first WSI such that the second WSI is characterized by a second resolution lower than the first resolution; apply an adaptive thresholding technique to the second WSI to create a mask distinguishing background from one or more patches, where the mask is characterized by the second resolution. The logic is further operable to: apply the mask to the first WSI to extract the one or more patches, providing a third WSI with the extracted patches, characterized by a third resolution, greater than the second resolution and lower than the first resolution; use a first machine learning system to operate on the third WSI to create a heat map at the third resolution, indicating a subset of the patches, each patch in the subset considered likely to include one or more clusters of tumor cells; and use a second machine learning system to operate on the first WSI in conjunction with the heat map such that each patch of the subset is segmented in a corresponding output image at the first resolution, outlining one or more corresponding clusters.

A further understanding of the nature and the advantages of particular embodiments disclosed herein may be realized by reference of the remaining portions of the specification and the attached drawings.

DETAILED DESCRIPTION OF EMBODIMENTS

Embodiments described herein are directed to the processing of Whole Slide Images of tissue samples to achieve tumor detection and segmentation, by detecting and delineating areas in the images corresponding to cells that that have preferentially taken up stains that preferentially target cancerous cells. The present invention not only avoids the need for real-time input from pathologists or other related experts, but also provides additional advantages over other existing approaches. These advantages are the results of using a novel adaptive thresholding technique to perform background removal, and of carrying out different image processing steps at different resolution levels, commensurate with the reasonable requirements of each step.

Figure 1:
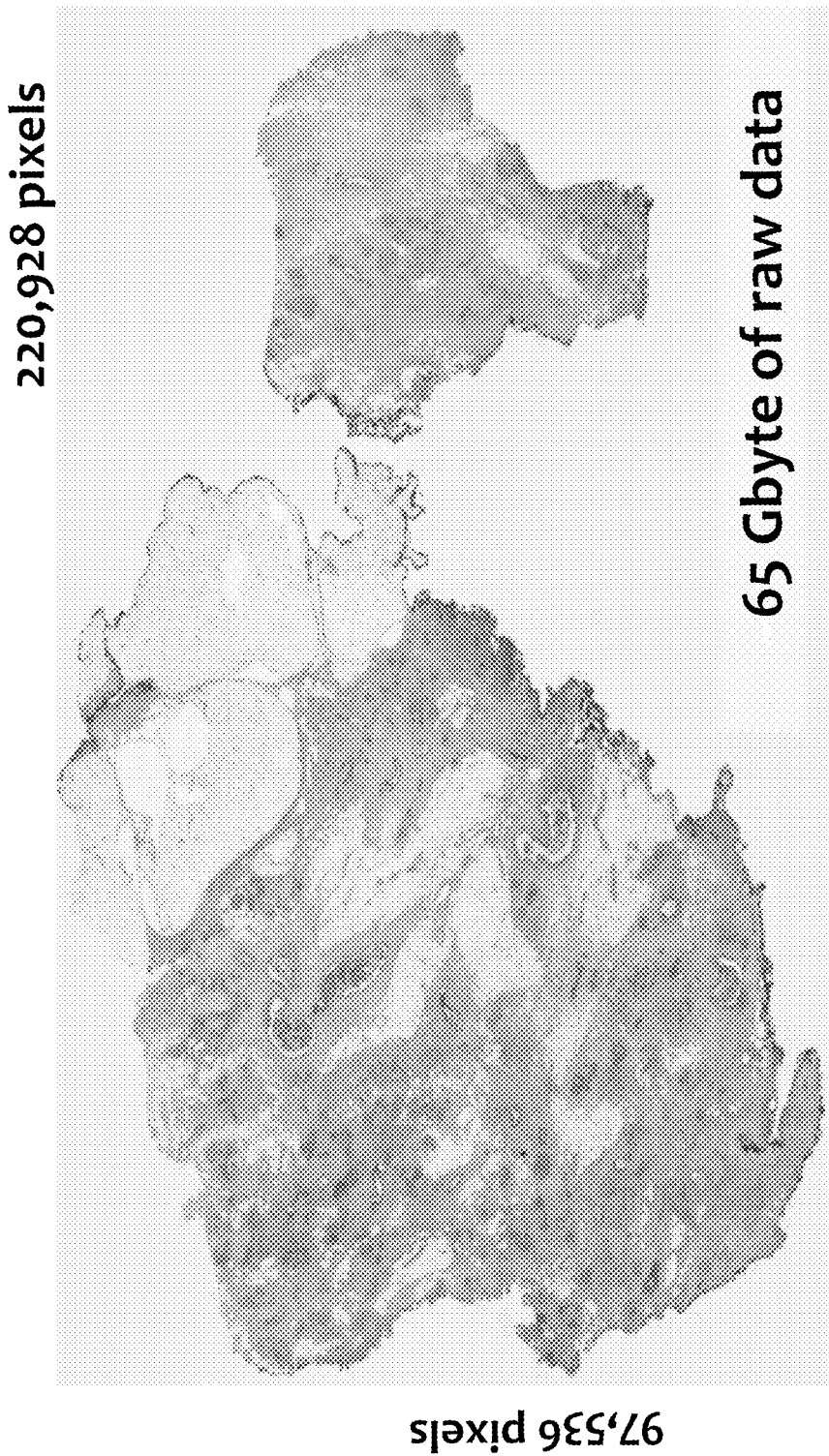
FIG. 1 illustrates a typical Whole Slide Image of a type to which embodiments of the present invention may be applied.
Figure 2:
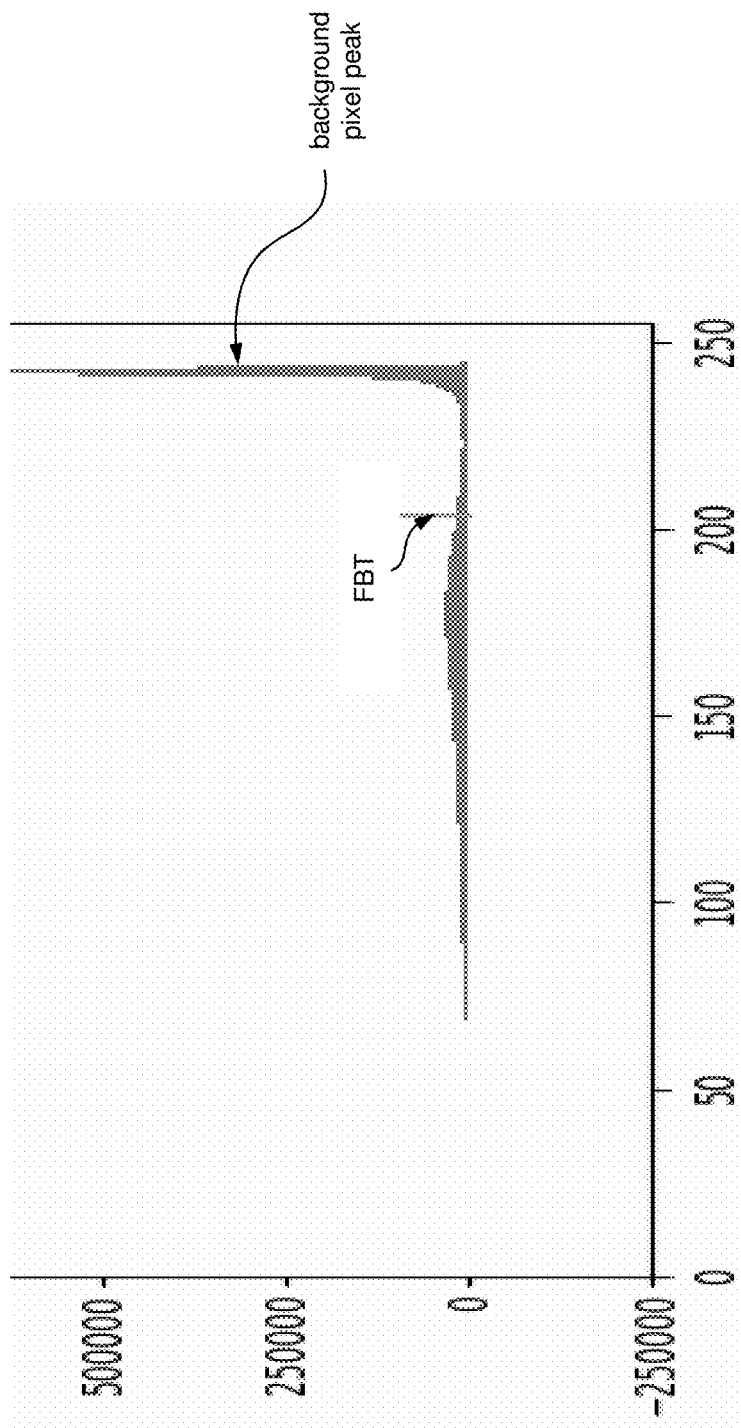
FIG. 2 illustrates a prior art approach to setting a threshold for background removal.
Figure 3:
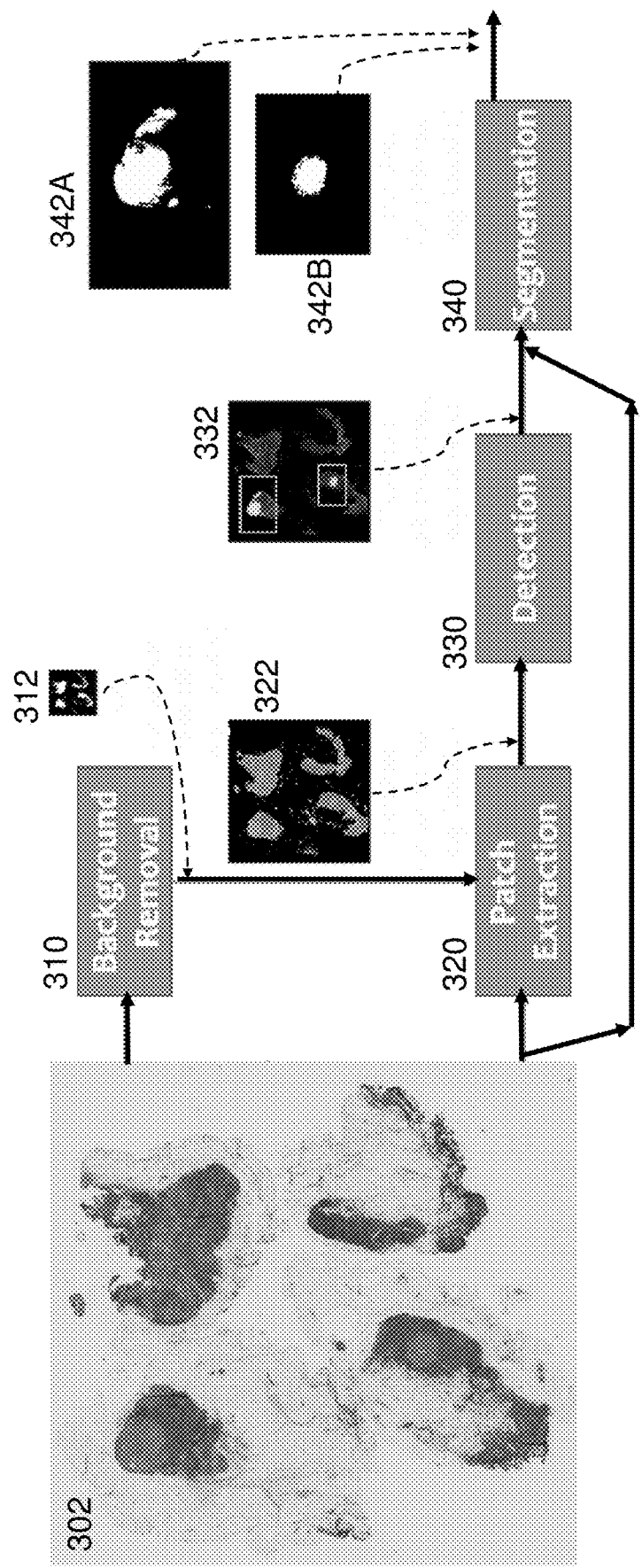
FIG. 3 illustrates a scheme for tumor detection and segmentation according to some embodiments of the present invention.

FIG. 3 schematically illustrates a workflow sequence according to some embodiments of the present invention. The raw input to the image processing system is whole slide image (WSI) 302. This is typically a high-resolution image, with numbers of pixels of the order of $10^{10}$ being common, as indicated by FIG. 1. The image may be colored, but is shown here in greyscale for convenience. A novel background removal process 310 is carried out on a low resolution version of WSI 302, to create a low-resolution mask like that shown at 312. A typical pixel count for such a mask is $10^3$ by $10^2$, with each mask pixel of course being much larger than the pixels in WSI 302. In the created mask, all pixels of transmissivity high enough that they may reasonably be presumed to correspond to the cell-free background are set to be opaque, leaving the remaining pixels, of low transmissivity and hence presumed to correspond to cells, some of which could be cancerous, clear. The method by which the pixels' "black and white" assignments are made will be described in more detail below, with reference to FIGS. 2 and 4.

The low-resolution version of the input image mentioned above, and the medium (between low and high) resolution versions mentioned below are typically formed by simply sub-sampling the original high resolution WSI 320.

A patch extraction process 320 is then performed, by applying mask 312 to a moderate resolution version of the high-resolution input WSI 302, creating a moderate-resolution image 322, from which patches of pixels of interest (typical patch size 224 by 224 pixels) can be extracted and retained with their actual intensity counts, while their surrounding or adjacent patches of uninformative background are completely removed from further consideration.

The moderate resolution image 322 (a typical pixel count is $10^4$ by $10^4$) is then operated on by process 330 to detect "hot spots" within the patches, representing cells most likely to be cancerous, producing moderate resolution "heat map" 332, which in turn is used in segmentation process 340 on the high resolution input WSI to provide images such as 342A and 342B, showing the most likely cancerous cell clusters at high-resolution. The methods used to carry out processes 330 and 340 will be described in more detail below.

Returning first to the background removal process, as noted above FIG. 1 illustrates an exemplary WSI of stained tissue, and FIG. 2 illustrates how analysis of the optical transmission through such a slide is carried out in standard, prior art approaches. As shown in FIG. 2, a histogram of numbers of pixels (vertical axis) vs. intensity (horizontal axis) is typically characterized by two peaks, one tall, sharp peak at the high intensity, right hand end, and one much lower, broader peak at somewhat lower intensities. A fixed binary threshold FBT is set by criteria that basically choose a value sufficiently low relative to the intensity corresponding to the histogram maximum (set by the tall peak, and whatever scaling normalization process has been used to conveniently capture the data) to be sure of keeping all "background pixels" to the right hand side of that threshold. The problem is that there is so much variation in the details of the intensity distribution between different slides according to the type of tissue, and the precise conditions of the staining and imaging process, that choosing a single (fixed) threshold based simply on the maximum counts recorded in a pixel or pixel group means that the threshold would not necessarily lie conveniently in a valley well separated from the tails of both beaks. Typically, current approaches take a "safe" approach that may work for a majority of slides in avoiding the sharp background peak—for example by setting the FBT at a count value of 85% of the maximum—but this means that in many cases, the pixels of real interest (as possible cancerous) may be distributed over such a broad range (in the short peak) that a significant number of them may also lie to the right of the FBT, and be mistakenly rejected as background. This means that useful diagnostic information may well be lost at this early stage of image processing.

Figure 4:
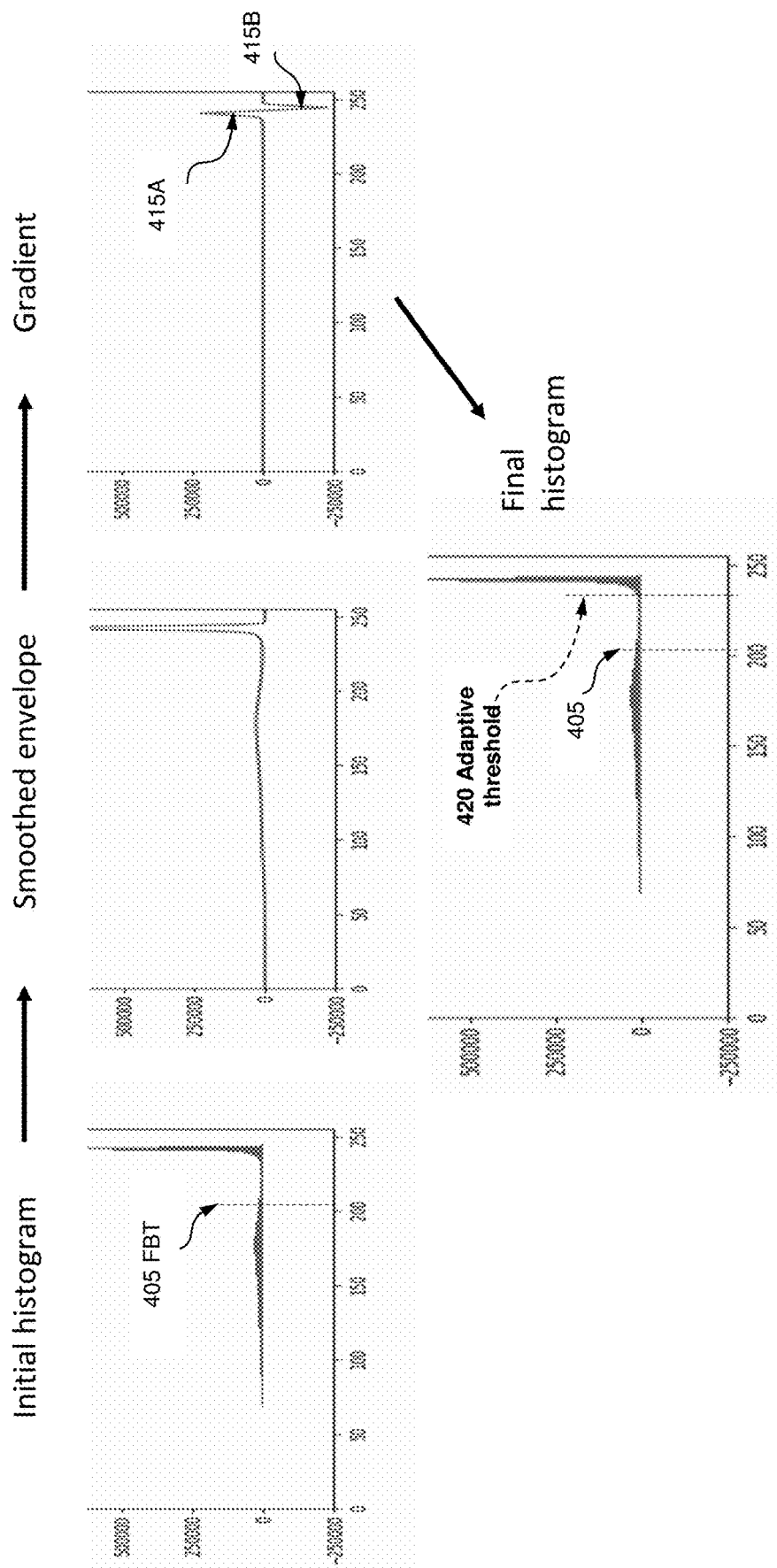
FIG. 4 illustrates an approach to setting a threshold for background removal according to some embodiments of the present invention.

FIG. 4 illustrates how an alternative background removal process may function, according to embodiments of the present invention. Instead of a fixed binary threshold 405, an adaptive threshold 420 is established, determined for each slide image according to the statistics of the intensity distribution in that particular image. Moreover, the "adaptation" is not simply to an intensity value representative of the height of the higher peak of the distribution (such as the maximum value itself, or an averaged or median value, or smoothed versions of those) but by the sharpness of that higher peak. This approach means that adaptive threshold 420 will automatically be set very close to the tail (on the low count side) of the higher, background peak while still keeping virtually all the corresponding background pixels to one side (the high count, right-hand side as shown). Comparing the position of adaptive threshold 420 with prior art FBT 405, it is clear that choosing the former will allow more pixels of potential clinical importance to remain on the low count, left hand side of the threshold, so that the corresponding cells can be included in subsequent stages of image processing.

The calculation of the adaptive threshold 420 is carried out as follows. The raw histogram data are smoothed, typically using a Gaussian filter, though other noise removal filters may be used without departing from the spirit of the present invention. Next, the gradient of the filtered data is calculated as a function of intensity value. As FIG. 4 shows, that gradient will be large and positive (see 415A) close to the low count, left-hand side of the higher peak and large and negative (see 415B) close to its right-hand side but only the positive values are used in the next part of the calculation. The mean value of the positive gradient values is determined, and the adaptive threshold 420 set in relation to that mean value. This linkage (adaptation) to the mean value of positive gradient of intensity rather than simply the intensity levels themselves enables the threshold to be optimized in terms of excluding background pixels while retaining pixels of interest, as discussed above. The contrast with fixed binary threshold 405 is clear.

In some embodiments, the details of how the linkage to gradient is made involve first calculating the mean value of positive gradient, and setting the threshold value to be equal to the smallest intensity value corresponding to that mean value of positive gradient. This means that all pixels having intensity value lower than or equal to the threshold value will be considered as being of interest for further processing, and so assigned to be clear in the mask being created, and all pixels of intensity value higher than the threshold value will be considered as background, so are assigned to be opaque in that background removing mask.

This specific method of setting the adaptive threshold as exactly corresponding to the smallest pixel value at which the intensity gradient is as close as possible to being equal to the mean positive gradient but without exceeding it is expected to provide a particularly well optimized threshold, approaching very close to the foot of the background peak, but other embodiments may differ slightly in the details (such as, for example setting it to be 10% lower) without departing from the spirit of the present invention.

In some embodiments, background removal may include an initial or preliminary step of spectral filtering of raw image data, carried out prior to the setting of thresholds described above. Stained tissue samples typically exhibit complex combinations of colors as even normal tissue cells and intracellular materials may be naturally colored, often in red or purple regions of the visible spectrum. It has in fact been experimentally observed that useful diagnostic coloring due to preferential uptake of stains shows up predominantly in green regions of the spectrum, while coloring in other regions of the spectrum are more associated with normal background cells. In a typical red green blue (RGB) image sensor system, therefore, where image data resides in red, green and blue channels, the useful diagnostic information lies predominantly in the green channel, and blue and red channel data may be discarded before a threshold setting method (as discussed above) is applied to data in the chosen, green channel. In some embodiments, data may reside in two or more channels, other than or in addition to the typical RGB ones.

The spatial resolution of the input WSI is extremely high, as discussed above, but the background mask to be applied to such an image to extract patches of cells of interest need not be nearly as high. Embodiments of the present invention create background masks of much lower resolution, for example by sub-sampling pixels of the input WSI to create a second image at this much lower resolution before the adaptive processing technique described above is applied.

Returning to FIG. 3, after patch extraction process 320 is completed, detection process 330 is carried out, using a trained machine learning/AI system, on moderate resolution image 322 to find "hot spots" within the extracted patches. The output of process 330 is moderate resolution "heat map" 332, which in the illustrated instance shows (via the white outlined rectangles) that only two of the extracted pixel patches are likely to include cancer cells. This determination is based on the expertise of pathologists or other professionals involved in prior training of the system, to be discussed in more detail below with reference to FIG. 6.

At this point in the process, portions of the original WSI 302 corresponding to the patches flagged by the detection system in image 332 are input into the same machine learning/AI system, which is now operated in a different mode, to carry out a segmentation or outlining process 340 on the hot spot areas defined within each of those patches. This segmentation process again makes use of the expertise of the professionals involved in prior training of the system, but applies that to the relevant portions of image 302 at the maximum available resolution, to provide precise delineation of the suspect areas. Images 342A and 342B are examples of the results of process 340, showing the most likely cancerous cell clusters.

Figure 5:
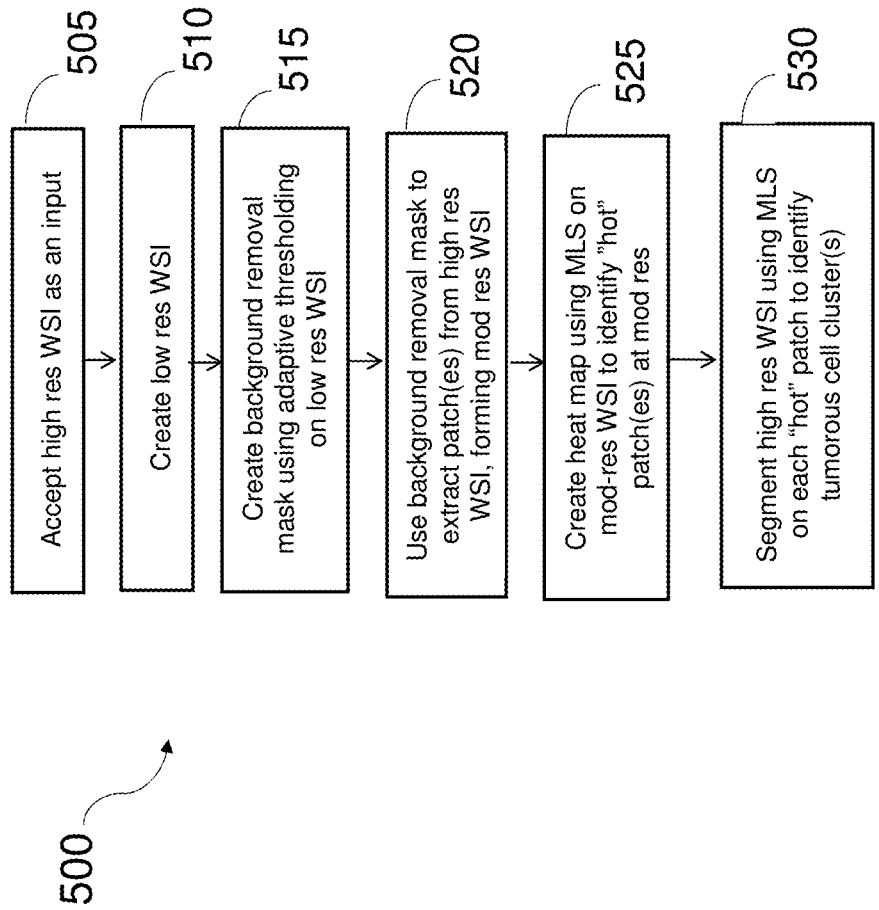
FIG. 5 is a flowchart of a method of tumor detection and segmentation according to some embodiments of the present invention.

FIG. 5 is a flowchart showing steps of a method of tumor detection and segmentation according to various embodiments of the present invention, as discussed above. At step 505, a high resolution WSI is accepted as an input. At step 510, a low resolution WSI is created from that input. At step 515, a background removal mask is created, using an adaptive thresholding method on the low resolution WSI. At step 520, the background removal mask is used to extract one or more patches from the high resolution WSI, forming a moderate resolution WSI. At step 525, a heat map is creased using a machine learning or artificial intelligence system on a moderate resolution WSI, to identify "hot" patches at a moderate resolution. In other words, a subset of the patches considered by the MLS most likely to correspond to cancer-containing cells are identified. At step 530, the high resolution WSI is segmented using the MLS on each of the identified "hot" patches, but in this case to more precisely delineate any cluster of tumorous cells within each patch, by operating at the original, high resolution.

Figure 6:
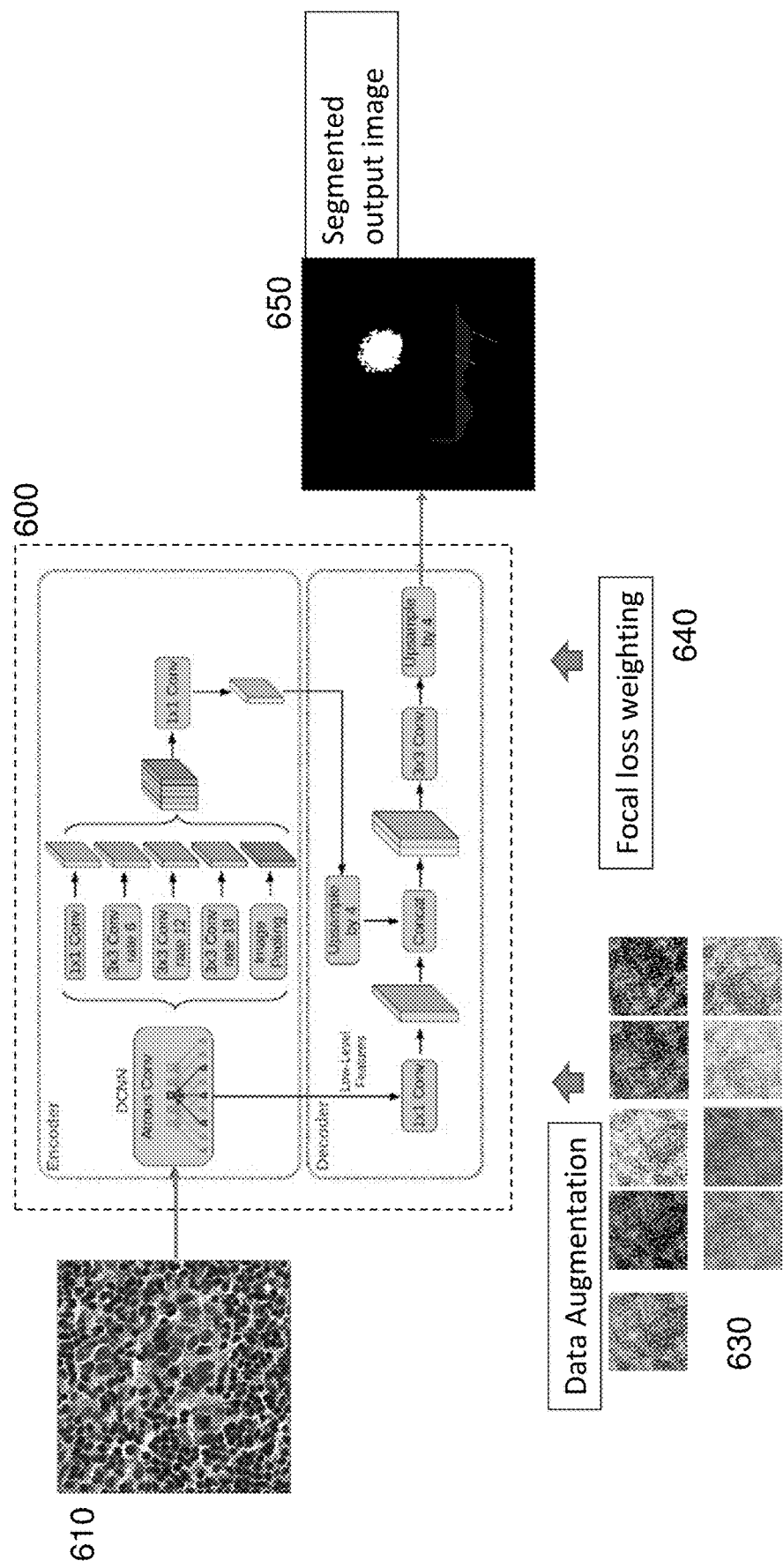
FIG. 6 illustrates a framework for machine learning applied to tumor detection and segmentation according to some embodiments of the present invention.

FIG. 6 schematically illustrates aspects of training a machine learning system or framework 600, whose architecture is of a type well known in the art, but which in the present invention is configured, trained, and applied to the specific task of tumor detection and segmentation according to various embodiments discussed above. One example of a system architecture suited to the present invention is DeepLab-v3+ but many others could be used. The case illustrated in the figure shows the output of the system as a segmented image, but essentially the same system can be (and typically is) applied serially, first in one mode for detection, and then in a second mode for segmentation. A separate training process is carried out for each mode.

In other cases, not illustrated, two different systems of essentially the same network architecture but configured with different sets of parameters, are separately trained and applied, one for detection and the other for the final segmentation step of the process.

The inner details of system 600 are not part of this invention and will not be discussed further, but key operational steps in the training of system 600 are illustrated. A plurality of training images such as image 610 is input to the system, a human expert provides a "true" output 650 (shown in this case as a segmented image, but as noted above, in the detection mode, the output would be a heat map) and the internal parameters and connections within system 600 "learn" how to reproduce that output (segmentation in the illustrated case). The learning is iteratively improved as more and more images are input and experts validate the outputs. As good training images of WSI tissues of interest are generally scarce, a data augmentation process 630 may be implemented, in which operations such as scaling, flipping, rotating, and/or perturbing color, contrast, sharpness etc. may be carried out on each good original WSI, to be fed into the system as "new" images. In some implementations, a focal loss weighting scheme 640 (of a type well known in the art) may also be used, so that the system is systematically "biased" towards successful detection and segmentation of tumors in difficult or hard cases rather than easy ones.

Embodiments described herein provide various benefits to tumor detection and segmentation for digital pathology images. In particular, embodiments provide computationally efficient ways to use an AI platform to process images at resolutions optimized to the sub-task at hand, and employ novel highly advantageous methods of adaptive background removal, that retain more of the information-rich image pixels that might otherwise be lost.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of tumor detection and segmentation for Digital Pathology; the method comprising:

accepting as an input a first Whole Slide Image (WSI) characterized by a first resolution;

creating a second WSI by sampling the first WSI such that the second WSI is characterized by a second resolution lower than the first resolution;

applying an adaptive thresholding technique to the second WSI to create a mask distinguishing background from one or more patches, the mask being characterized by the second resolution;

applying the mask to the first WSI to extract the one or more patches, providing a third WSI with the extracted patches, characterized by a third resolution, greater than the second resolution and lower than the first resolution;

using a first machine learning system to operate on the third WSI to create a heat map at the third resolution, indicating a subset of the patches, each patch in the subset considered likely to include one or more clusters of tumor cells; and using a second machine learning system to operate on the first WSI in conjunction with the heat map such that each patch of the subset is segmented in a corresponding output image at the first resolution, outlining one or more corresponding clusters;

wherein the adaptive thresholding technique comprises setting a threshold determined by a sharpness value characterizing a peak corresponding to the background in a distribution of pixel values over the second WSI.

2. The method of claim 1,
wherein the second WSI comprises image data in at least two channels; and
wherein the adaptive thresholding technique comprises removing pixels with values above a threshold value in a chosen one of the at least two channels.

3. The method of claim 1,
wherein the second WSI comprises image data in red, green and blue channels; and
wherein the adaptive thresholding technique comprises removing pixels with values above a threshold value in the green channel.

4. The method of claim 2,
wherein the threshold value is set for the second WSI by analyzing intensity statistics of image data in the chosen channel.

5. The method of claim 4,
wherein the analyzing comprises:
applying a Gaussian filter to a first histogram of image intensity data in the chosen channel to create a smoothed histogram;
calculating a gradient histogram corresponding to the smoothed histogram, from which a mean value of positive gradient is determined; and
setting the threshold value in relation to the mean value of positive gradient.

6. The method of claim 5,
wherein setting the threshold value in relation to the mean value of positive gradient comprises:
setting the threshold value equal to an intensity value corresponding to the mean value of positive gradient, such that all pixels of intensity value lower than or equal to the threshold value are assigned to be clear in the mask, and all pixels of intensity value higher than the threshold value are assigned to be opaque in the mask.

7. The method of claim 1,
wherein the first machine learning system is the second machine learning system.

8. An apparatus comprising:
one or more processors; and
logic encoded in one or more non-transitory media for execution by the one or more processors and when executed operable to:
accept as an input a first Whole Slide Image (WSI) characterized by a first resolution;
create a second WSI by sampling the first WSI such that the second WSI is characterized by a second resolution lower than the first resolution;
apply an adaptive thresholding technique to the second WSI to create a mask distinguishing background from one or more patches, where the mask is characterized by the second resolution;
apply the mask to the first WSI to extract the one or more patches, providing a third WSI with the extracted patches, characterized by a third resolution, greater than the second resolution and lower than the first resolution;
use a first machine learning system to operate on the third WSI to create a heat map at the third resolution, indicating a subset of the patches, each patch in the subset considered likely to include one or more clusters of tumor cells; and
use a second machine learning system to operate on the first WSI in conjunction with the heat map such that each patch of the subset is segmented in a corresponding output image at the first resolution, outlining one or more corresponding clusters;
wherein the adaptive thresholding technique comprises setting a threshold determined by a sharpness value characterizing a peak corresponding to the background in a distribution of pixel values over the second WSI.

9. The apparatus of claim 8,
wherein the second WSI comprises image data in at least two channels; and
wherein the adaptive thresholding technique comprises removing pixels with values above a threshold value in a chosen one of the at least two channels.

10. The apparatus of claim 8,
wherein the second WSI comprises image data in red, green and blue channels; and
wherein the adaptive thresholding technique comprises removing pixels with values above a threshold value in the green channel.

11. The apparatus of claim 9,
wherein the threshold value is set for the second WSI by analyzing intensity statistics of image data in the chosen channel.

12. The apparatus of claim 11,
wherein the analyzing comprises:
applying a Gaussian filter to a histogram of image intensity data in the chosen channel to create a smoothed histogram;
calculating a gradient histogram corresponding to the smoothed histogram, from which a mean value of positive gradient is determined; and
setting the threshold value in relation to the mean value of positive gradient.

13. The apparatus of claim 12,
wherein setting the threshold value in relation to the mean value of positive gradient comprises:
setting the threshold value equal to an intensity value corresponding to the mean value of positive gradient, such that all pixels of intensity value lower than or equal to the threshold value are assigned to be clear in the mask, and all pixels of intensity value higher than the threshold value are assigned to be opaque in the mask.

14. The apparatus of claim 8,
wherein the first machine learning system is the second machine learning system.

15. An apparatus comprising:
one or more processors; and
software encoded in one or more non-transitory computer-readable media for execution by the one or more processors and when executed operable to:
accept as an input a first Whole Slide Image (WSI) characterized by a first resolution;
create a second WSI by sampling the first WSI such that the second WSI is characterized by a second resolution lower than the first resolution;
apply an adaptive thresholding technique to the second WSI to create a mask distinguishing background from one or more patches, where the mask is characterized by the second resolution;
apply the mask to the first WSI to extract the one or more patches, providing a third WSI with the extracted patches, characterized by a third resolution, greater than the second resolution and lower than the first resolution;
use a first machine learning system to operate on the third WSI to create a heat map at the third resolution, indicating a subset of the patches, each patch in the subset considered likely to include one or more clusters of tumor cells; and use a second machine learning system to operate on the first WSI in conjunction with the heat map such that each patch of the subset is segmented in a corresponding output image at the first resolution, outlining one or more corresponding clusters;

wherein the adaptive thresholding technique comprises setting a threshold determined by a sharpness value characterizing a peak corresponding to the background in a distribution of pixel values over the second WSI.

16. The apparatus of claim 15, wherein the second WSI comprises image data in at least two channels; and wherein the adaptive thresholding technique comprises removing pixels with values above a threshold value in a chosen one of the at least two channels.

17. The apparatus of claim 15, wherein the second WSI comprises image data in red, green and blue channels; and wherein the adaptive thresholding technique comprises removing pixels with values above a threshold value in the green channel.

18. The apparatus of claim 16, wherein the threshold value is set for the second WSI by analyzing intensity statistics of image data in the chosen channel.

19. The apparatus of claim 18, wherein the analyzing comprises:

applying a Gaussian filter to a first histogram of image intensity data in the chosen channel to create a smoothed histogram;

calculating a gradient histogram corresponding to the smoothed histogram, from which a mean value of positive gradient is determined; and setting the threshold value in relation to the mean value of positive gradient.

20. The apparatus of claim 19, wherein setting the threshold value in relation to the mean value of absolute gradient comprises:

selecting a group of values consisting of all values present in the first histogram that are equal to or lower than the mean value of absolute gradient; and setting the threshold value as the highest value in the group.

* * * * *